Figure 4:
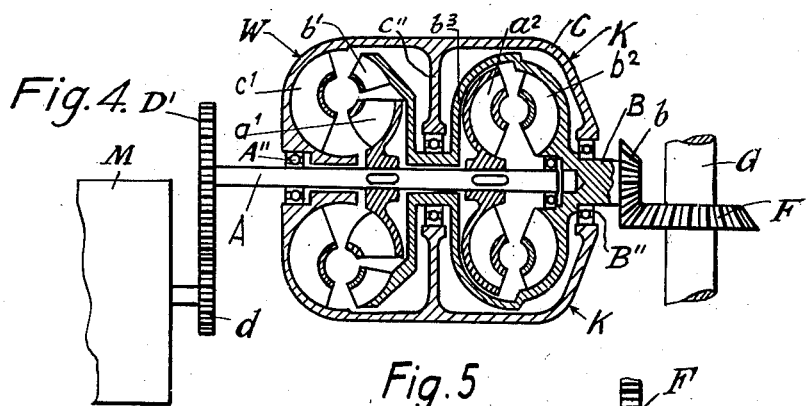

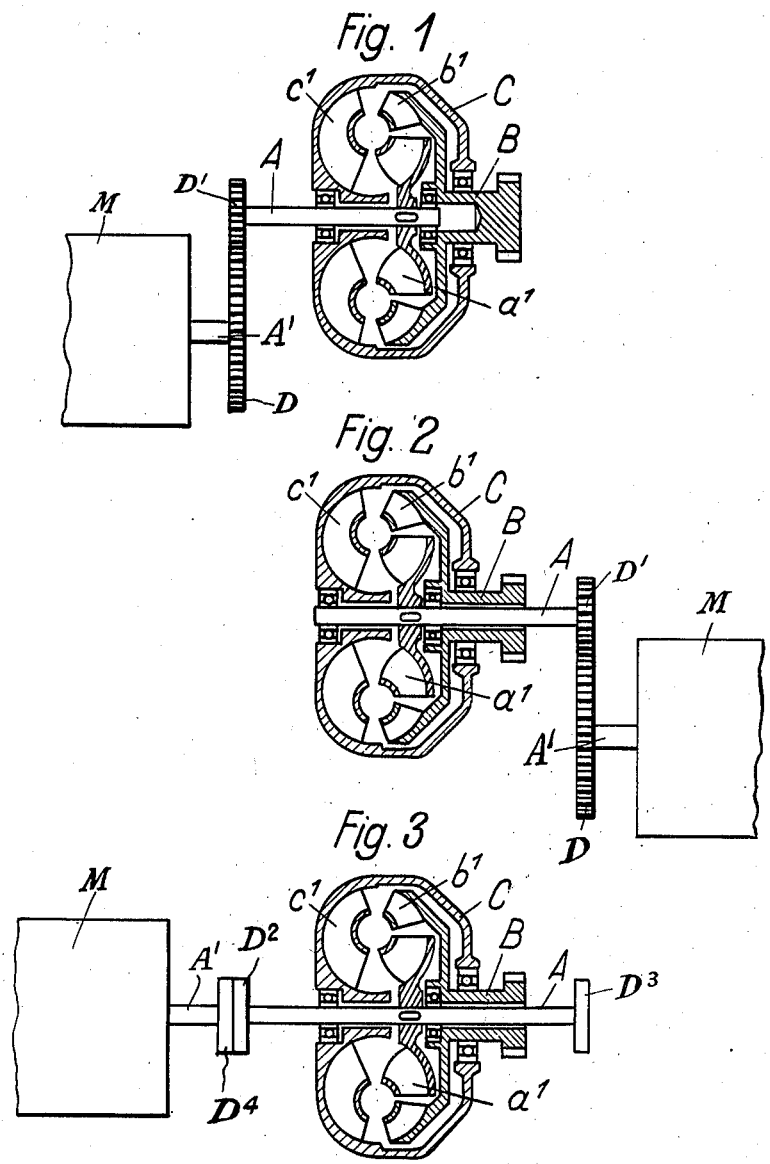

May 16, 1939.   D. GÖSSLER   2,158,231
HYDRAULIC POWER PLANT
Filed Dec. 12, 1934   2 Sheets-Sheet 2

Inventor
Dietrich Gössler

Patented May 16, 1939

2,158,231

UNITED STATES PATENT OFFICE 2,158,231

HYDRAULIC POWER PLANT

Dietrich Gössler, Heidenheim-on-the-Brenz, Germany, assignor to American Voith Contact Company, Inc., New York, N. Y.

Application December 12, 1934, Serial No. 757,243
In Germany December 11, 1933

5 Claims. (Cl. 60—54)

My invention relates to improvements in hydraulic power plants and more particularly to improvements in the hydraulic power transmitting mechanisms forming part of such plants. Such mechanisms may be of the turbine torque transformer type, being equipped with a fixed guide apparatus, or they may be of the hydraulic clutch type, which lacks such apparatus. It is also within the scope of my invention to combine a transformer with such a clutch. It is an object of my invention to provide a device of the kind aforesaid, which is particularly adapted for use in connection with motor vehicles.

It is a further object of this invention to construct a mechanism of the kind referred to, for instance, a turbine transformer, the parts of which, with the only exception of the driving and driven shafts, are standardized so that the transformer can be used in connection with vehicles of different construction.

When applying turbine transformers or clutches to motor vehicles, the engine must be connected with the driving shaft and the wheels with the driven shaft in a manner which differs according to the particular kind of construction of the vehicle. Consequently a turbine transformer in order to be applicable to different kinds of vehicles must be so designed that the connection with the engine and the vehicle wheels can be effected either on the same or on opposite sides of the transformer. In certain cases it may even be desirable or necessary to connect the engine to one or the other end of the driving shaft. Therefore, the driving and driven shafts of the transformer must be adaptable to the requirements of each individual case.

According to the present invention all the parts of the transformer or clutch with the only exception of the driving and driven shafts are standardized, the blades mounted on these shafts and, in the case of a transformer, the guide apparatus being of uniform size and configuration and adapted to be mounted in place on the shafts and in the casing supporting them no matter how the shafts themselves are arranged. In consequence thereof all the parts of the transformer with the exception of the shafts can be manufactured in mass production.

In order to render the shafts of a transformer adaptable to the various requirements, I combine with a driving shaft a driven shaft of larger diameter, which is either formed with a cavity or is hollow throughout, the driving shaft extending either into or through the driven shaft or its hub, which is supported in a bearing, the diameter of which is sufficiently great to allow both shafts to be accommodated therein. This arrangement also enables both ends of the driving shaft to project from the casing surrounding the transformer and I am therefore enabled to connect the driving shaft to the engine either at one or the other end.

Furthermore, in order to render a standardized turbine transformer of the kind aforesaid adapted for different performances, I provide means whereby the number of revolutions of the driving shaft can be adapted to the performance desired in each individual case.

In the drawings affixed to this specification and forming part thereof several arrangements of turbine transformers embodying my invention are illustrated diagrammatically by way of example.

Figure 5:
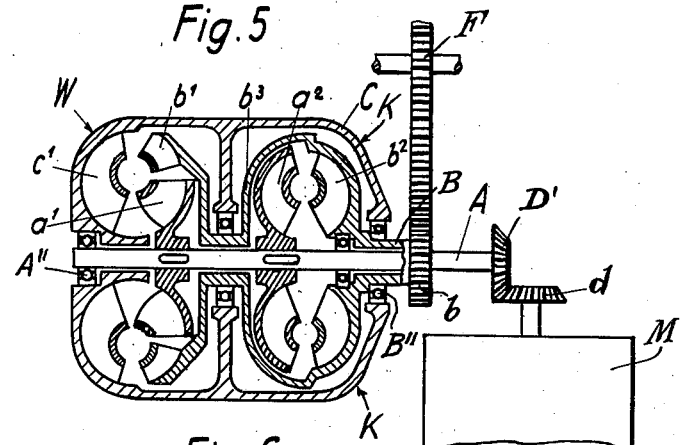
Figure 6:
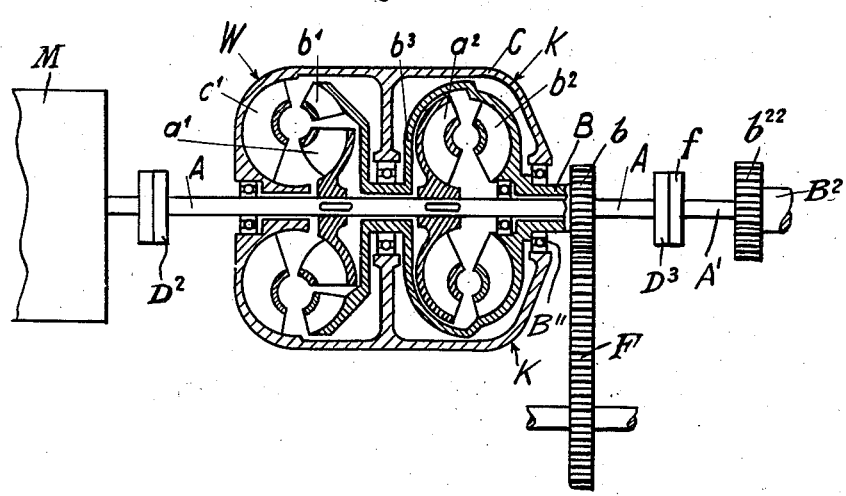

In the drawings,

Figs. 1, 2 and 3 are axial sections of single circuit transformers showing different arrangements of the driving and driven shafts, and Figs. 4 to 6 are similar views of double circuit transformers showing similar arrangements of the shafts.

Referring to the drawings and first to Fig. 1, A is the driving shaft and B is the driven shaft, C being the casing, in which these shafts are mounted for rotation, the inner end of driving shaft A projecting into a cavity of the driven shaft B.

A pinion $D'$ mounted on the outer end of the shaft A meshes with a spur gear D on the shaft $A'$ of an engine or motor M.

In the arrangement shown in Fig. 2, the driven shaft B has the form of a tube and the driving shaft A extends through the driven shaft, the operative ends of both shafts and the pinion $D'$ being located on the same side of the transformer.

In contradistinction thereto, the driving shaft A in Fig. 3 extends through the driven shaft B with its ends projecting on either side of the transformer, so that the engine may be coupled with either one or the other end of the driving shaft.

Pinions or clutching members $D^2$ and $D^3$ are secured on the ends of shaft A for this purpose, and $D^4$ is a clutching member on the motor shaft $A'$ for connecting the latter to the member $D^2$.

In all modifications here shown $a^1$ is the primary blade wheel mounted on the driving shaft A, while $b^1$ is the secondary blade wheel mounted on the driven shaft B, $c^1$ being the guide apparatus mounted in the casing C.

The mechanism described with reference to Figs. 1-3 is of the transformer type since it is provided with the fixed guide apparatus $c'$ in the fixed casing C. If the casing were rotary as well as the driving shaft A and equipped with a secondary blade wheel for cooperation with the primary blade $a'$ of the impeller, and if the guide apparatus were lacking, it would be of the clutch type. The combination of a torque transformer with a hydraulic flow clutch, as above defined, will now be described with reference to Figs. 4, 5 and 6.

Here A is the driving shaft connected with the engine through the pinion $D'$ which is keyed on the outer end of the driving shaft A, as in Fig. 1, and $a^1$ is the primary blade wheel of the transformer W, while $a^2$ is the primary blade wheel of the clutch K. $b^1$ is the secondary wheel of the transformer, while $b^2$ is the secondary wheel of the clutch K which is without the fixed guide apparatus of the transformer W. The secondary wheel $b^2$ of the clutch K rotates with the driven shaft B with which it is integral. The secondary wheels $b^1$, $b^2$ of the transformer and the clutch, respectively, are connected with each other and with the driven shaft B by an intermediate rotary casing $b^3$ which is integral with the driven shaft and the secondary wheel $b^2$ at the corresponding end and is mounted at its centre in a bearing of a transverse partition $C''$ in a stationary casing C. $c^1$ is the guide apparatus mounted in said casing. $A''$ and $B''$ are ball bearings for the primary shaft A and the secondary shaft B, respectively. F and $b$ are gear wheels connecting the driven shaft with the shaft G, while $d$ is a gear wheel connecting the driving shaft A to the engine M. $B^2$ is a shaft which by means of the spur wheel $b^{22}$ and coupling $f$ is connected to the primary shaft A. The design of the parts forming the two circuits is identical in all cases, no matter whether the engine is coupled with the driving shaft A on the transformer side (Fig. 4) or on the coupling side (Fig. 5) or on either one or the other side (Fig. 6).

It will appear that the connections to the engine M in Figs. 5 and 6 correspond respectively to those in Figs. 2 and 3.

I wish it to be understood that I do not desire to be limited to the exact details of construction shown and described for obvious modifications will occur to a person skilled in the art.

I claim:

1. Hydraulic power transmission of the Föttinger type comprising in combination an outer casing, a driving shaft and a driven shaft extending into said casing, said driven shaft including an at least partly hollow end portion surrounding and supporting part of said driving shaft, an intermediate casing connected with said driven shaft, an impeller mounted on said driving shaft and a secondary member mounted on said intermediate casing both arranged for cooperation as a coupling, and another impeller mounted on said driving shaft, another secondary member mounted on said intermediate casing and a guide portion fixed to said outer casing all arranged for cooperation as a torque transformer.

2. The combination according to claim 1, wherein the driven shaft includes a hollow portion supporting one end of said driving shaft, means for transmitting power to said driving shaft being arranged on the other end thereof.

3. The combination according to claim 1, wherein the driven shaft is hollow and the driving shaft extends through and beyond said driven shaft.

4. The combination according to claim 1, wherein the driven shaft is hollow and the driving shaft extends through and beyond said driven shaft and wherein means for transmitting power to said driving shaft are arranged on that end thereof projecting from said driven shaft.

5. The combination according to claim 1, wherein the driven shaft is hollow and the driving shaft extends through and beyond said driven shaft and wherein means for transmitting power to said driving shaft are arranged on either end thereof.

DIETRICH GÖSSLER.